United States Patent [19]

Chang et al.

[11] Patent Number: 5,226,018
[45] Date of Patent: Jul. 6, 1993

[54] GEOPHYSICAL PROSPECTING METHOD USING PSEUDO-RANDOM PULSE SEQUENCES

[75] Inventors: Chung Chang, Wilton, Conn.; Benoit Froelich, Marly Le Roi, France; Christopher V. Kimball, West Redding, Conn.

[73] Assignee: Schlumberger Technology Corporation, New York, N.Y.

[21] Appl. No.: 892,904

[22] Filed: Jun. 2, 1992

[30] Foreign Application Priority Data

Jun. 18, 1991 [FR] France ................................ 91 07455

[51] Int. Cl.$^5$ .............................................. G01V 1/36
[52] U.S. Cl. ......................................... 367/39; 367/41
[58] Field of Search ....................... 367/39, 41, 42, 56, 367/57

[56] References Cited

U.S. PATENT DOCUMENTS

| | | | |
|---|---|---|---|
| 3,307,648 | 3/1967 | Masterson | 367/41 |
| 3,873,958 | 3/1975 | Whitehouse | 367/126 |
| 4,168,485 | 9/1979 | Payton et al. | 367/41 |
| 4,326,129 | 4/1982 | Neufeld | 250/262 |
| 4,607,353 | 8/1986 | Muir | 367/39 |
| 4,743,753 | 5/1988 | Cheng et al. | 250/227 |
| 4,780,856 | 10/1988 | Becquey | 367/39 |
| 4,969,129 | 11/1990 | Currie | 367/41 |

FOREIGN PATENT DOCUMENTS

419245A2 9/1990 European Pat. Off. .

OTHER PUBLICATIONS

"Complementary Sets of Sequences" by C. Tseng and C. Liu, *IEEE Transactions Information Theory*, 18/5, 644–52, 1972.

"Complementary Series" by M. Golay, *IRE Transactions on Information Theory*, 82–87, 1961.

*Primary Examiner*—Ian J. Lobo
*Attorney, Agent, or Firm*—Leonard W. Pojunas

[57] ABSTRACT

A geophysical prospecting method comprises injecting signal energy in the form of at least two pseudo-random pulse sequences of the complementary sequence type into an underground formation. Next, the signal energy is detected after it has been attenuated by passing through the underground formations in the form of response signals. The response signals are correlated with reference signals comprising at least two pseudo-random binary sequences to yield correlations. The correlations are summed so that the resultant signal which corresponds to the subsurface response signal does not have secondary lobes. The method is applicable to seismic prospecting and more particularly to cross-well seismic surveying. It is also applicable to acoustic prospecting for logging measurements. In a preferred embodiment, the pseudo-random sequences comprise a pair of Golay sequences.

9 Claims, 5 Drawing Sheets

GEOPHYSICAL PROSPECTING METHOD USING PSEUDO-RANDOM PULSE SEQUENCES

FIELD OF THE INVENTION

The invention relates to a geophysical prospecting method applicable particularly to seismic prospecting, and to the acoustic prospecting used for certain logging measurements. In seismic prospecting, the invention is particularly applicable to cross-well seismic surveying.

BACKGROUND OF THE INVENTION

When energy is released into the subsurface from a seismic source or an acoustic source, a large portion of the energy encounters various geological strata or formations and is subjected to attenuation therein prior to being detected by a set of receivers. Detection by one or more receivers makes it possible, after performing multiple measurements and processing, to obtain an image of the subsurface structure. The signal y(t) detected by a receiver may be taken to be the response of the subsurface that the pulse p(t) has passed through after being emitted by an emitting source. More precisely, this response y(t) corresponds to the response c(t) of the subsurface plus added noise n(t), as shown diagrammatically in FIG. 1a. To illustrate this phenomenon, FIGS. 1b and 1c which are figures that have been obtained experimentally show the following: FIG. 1b, the emission of a single pulse p(t); and FIG. 1c, the detected signal y(t).

The greater the quantity of energy supplied by the pulse as emitted, the better the signal-to-noise ratio. Thus, it is generally desirable to provide as much energy as possible for each measurement to be made. This maximum energy is generally provided either by emitting pulses of short duration and high intensity, or else by emitting a series of pulses of lower intensity and over a relatively long period of time. The emission of high intensity pulses is not suitable in all applications. In particular, it is not suitable for down hole seismic surveys, and in particular for between-well seismic surveys. However, in both of these cases, the seismic sources, comprising explosive charges, for example, are received inside a well. It is not possible to use such sources capable of delivering sufficient energy without running the risk of damaging the wells. The same problem arises in acoustic prospecting.

It is then preferable to emit series of pulses from transducers which unfortunately have limited peak powers. Indeed, when these limits are exceeded, the transducers are damaged or even destroyed. In any event, the power transmitted via cables connecting the energy storage means (capacitors, for example) in the wells to external equipment is also limited.

On reception, processing is performed which comprises summing response signals for a given series of pulses to obtain a single response signal. This method is known as "stacking" and consists in taking the average of a plurality of signals. Unfortunately, using this averaging method considerably increases acquisition time, and this increase in time may be unacceptable for downhole seismic surveys and in particular for surveys between wells. Emitting a series of pulses makes it possible to increase the received signal level when sources of limited peak power are used since the energy is then taken from N emitted pulses that are separated by regular time intervals. The time interval Tm cannot be less than the total duration of the response of the subsurface c(t) to avoid mixing up successive responses in time. The total acquisition time thus becomes equal to NTm.

An attempt has been made to solve this problem when performing logging measurements by using pulses that are encoded. Reference may be made, for example to the state of the art as constituted by U.S. Pat. No. 4,326,129. That patent teaches using encoded pulses for logging measurements in order to reduce acquisition times that are too long when using the signal-averaging technique. That document describes using an energy source associated with control means to obtain pseudo-random sequences of energy pulses. These sequences are injected into the subsurface from the well and receiver(s) located in the well detect them after they have been reflected on the various underground formations encountered. The processing performed on the detected signal then consists in correlating the detected signal with the emitted signal. Consequently, the processing consists in performing correlation by means of a correlator. The subsurface response signal obtained by the correlation operation (between the emitted signal and the detected signal) has secondary lobes. Consequently, this processing gives rise to a poor signal-to-noise ratio. When the technique described in that patent is applied to between-well surveying, the signal-to-noise ratio becomes even more critical.

The state of the art constituted by U.S. Pat. No. 4,969,129 discloses improving the signal-to-noise ratio by exciting a source of m-sequence type encoded pulses. This solution has the advantage of not generating secondary lobes. M-sequences are periodic sequences in which the period is chosen in such a manner as to be greater than the subsurface response time. A first drawback of this solution comes from the fact that it is necessary to record the signals during at least one period, and consequently a great deal of memory space is required, since period duration is of the order of one second. A second drawback of the method comes from the fact that it is necessary for the emitter and for the receiver to be synchronized during at least two periods. This means that very accurate clocks must be used. For a one-second period, the accuracy covers two seconds.

SUMMARY OF THE INVENTION

An object of the present invention is to remedy the problems of the prior approaches.

The method of the invention yields a good signal-to-noise ratio. The response signal of the underground formations does not have secondary lobes. Memory space requirements and clock accuracy requirements are not increased. The present invention also makes it possible to obtain response signals that do not have secondary lobes due to simultaneous emission by a plurality of sources, with a single receiver or a single set of receivers being provided to detect the signals.

More particularly, the present invention provides a geophysical prospecting method. The steps include injecting an energy signal in the form of at least two pseudo-random pulse sequences of the complementary sequence type into a subsurface formation. The energy signal is detected after it has been attenuated by passing through various underground formations. The steps also include performing a set of correlations between the detected signal and a reference signal comprising at least two pseudo-random binary sequences. The correlations are summed so the resultant signal which corresponds to the subsurface response signal, does not have secondary lobes.

According to another characteristic of the invention, the injected signal comprises an even number of complementary sequences, and the reference signal comprises the same number of pseudo-random sequences. Thus the response signal obtained in a given time window by summing the correlations has a maximum in the center of the window and zeros throughout the remainder of the window.

According to another characteristic of the invention, the injected signal comprises two sequences, the sequences in this pair being Golay sequences. The reference signal comprises two binary sequences corresponding to the Golay sequences.

According to the invention, the injected signal is injected from a plurality of sources that simultaneously emit orthogonal complementary sequences.

According to the invention, the injected signal comprises a pair of orthogonal complementary sequences, with each sequence being injected simultaneously by all of the sources.

According to the invention, the signals are injected from a plurality of sources, each situated inside a distinct well, these signals being detected by a receiver or a set of receivers situated inside a well. The injected energy signal is then preferably a seismic signal.

According to the invention, the signals are injected from a plurality of sources situated in the same well and detected by a set of receivers situated in the same well to perform logging. The injected energy signal is then preferably an acoustic signal.

BRIEF DESCRIPTION OF THE DRAWINGS

The characteristics and advantages of the invention will be better understood from the following description given by way of non-limiting example and made with reference to the accompanying drawings, in which.

Prior Art

Prior Art

DESCRIPTION OF THE PREFERRED EMBODIMENTS

Figure 1A:
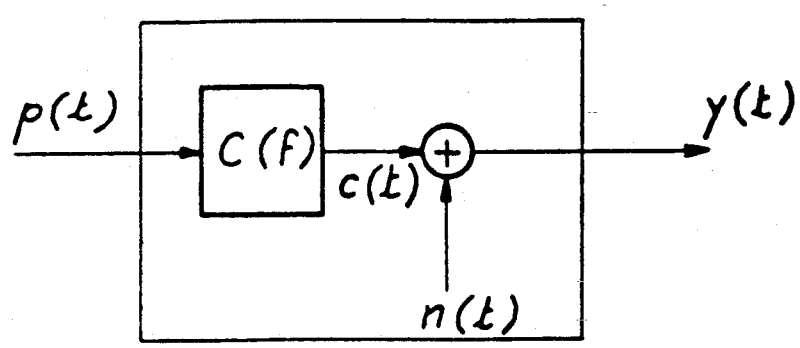
FIG. 1a is a diagram representing a model of the sub surface response to a pulse being sent.
Figure 1B:
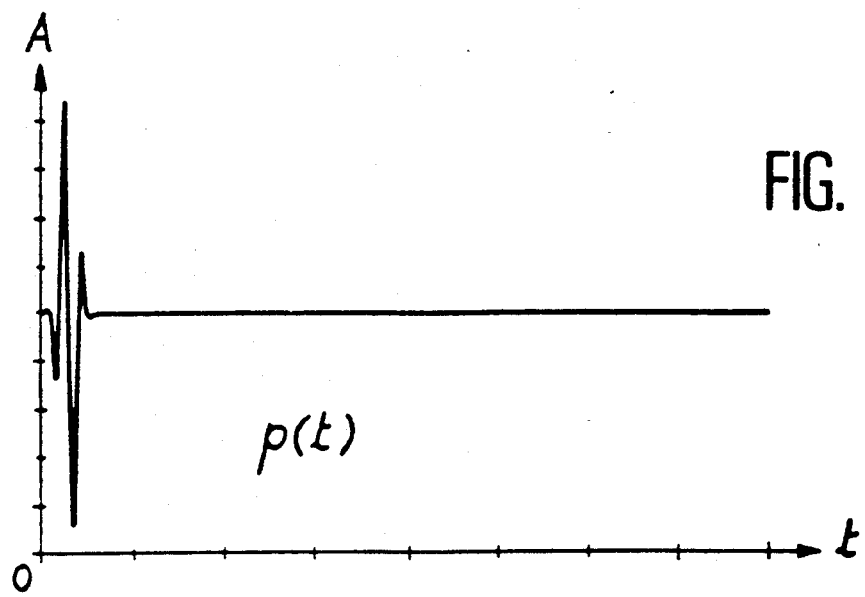
FIGS. 1b and 1c show a pulse as emitted and the response to said pulse.
Figure 1C:
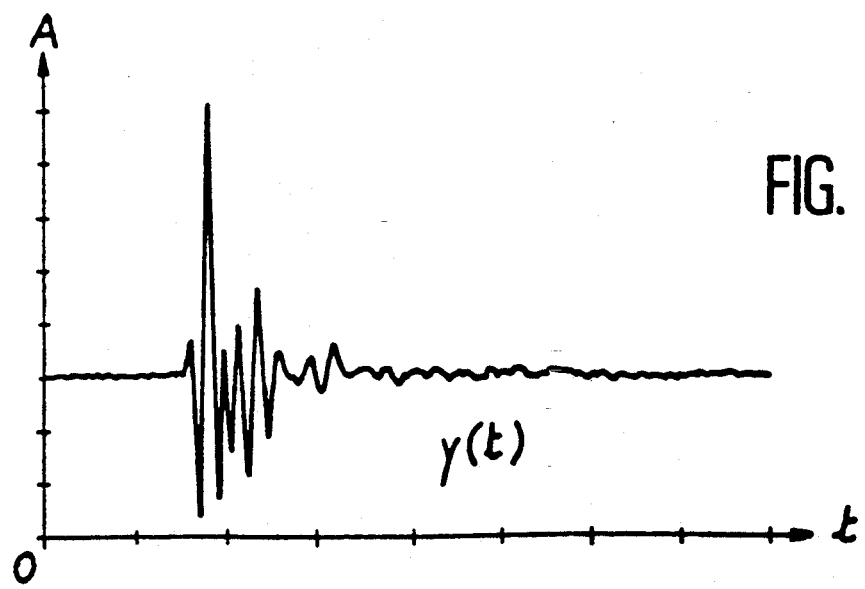
Figure 2:
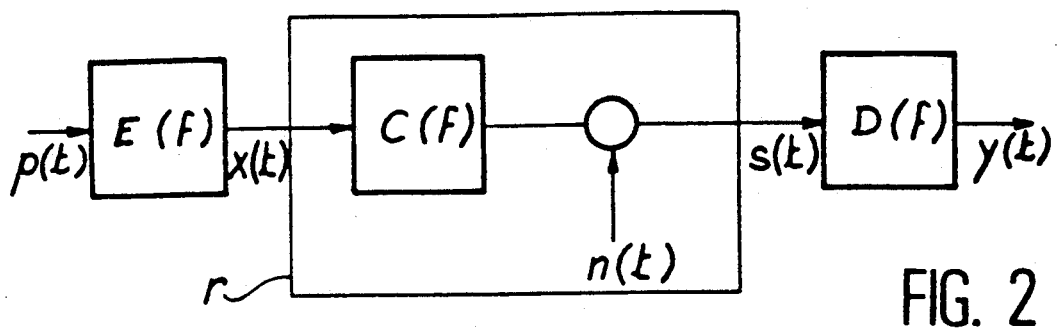
FIG. 2 is a block diagram applicable to the method of the invention.
Figure 3A:
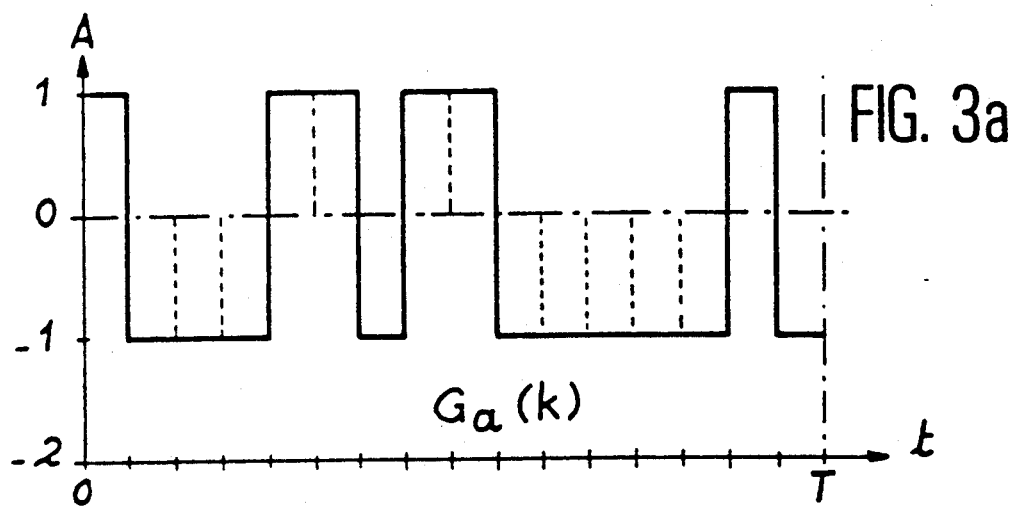
FIGS. 3a and 3b show one example of two complementary sequences.
Figure 3B:
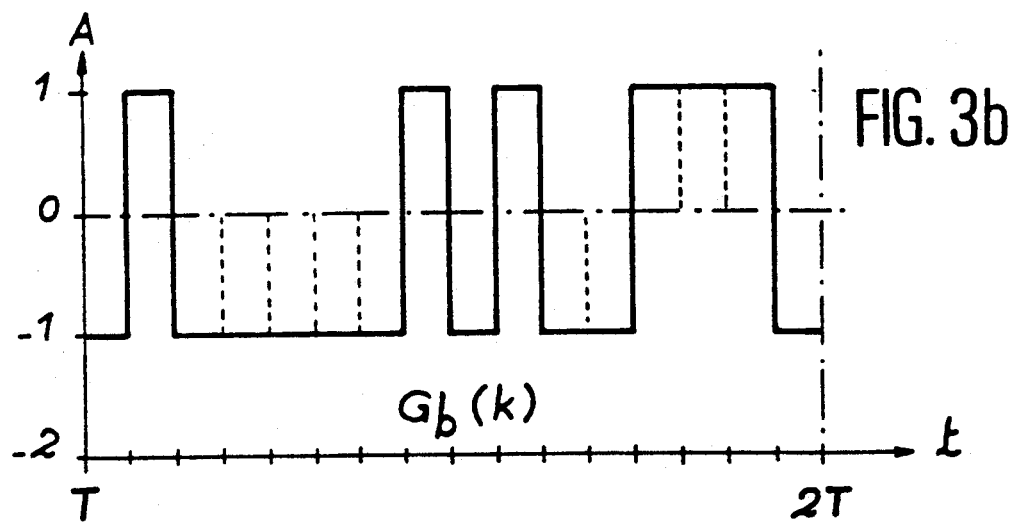

FIG. 2 is a diagram of apparatus for implementing the method of this invention. Box r represents the subsurface response to the signal x(t). According to the invention, the method consists in injecting an encoded energy signal into the subsurface of the earth. A coded signal is obtained from a source that emits energy p(t) and is applied to the input of a linear filter E(f). An output signal x(t) from the filter E(f) is injected into the subsurface of the earth and is subjected to attenuation C(f) as it passes through various subsurface formations prior to being detected by a reception means which may comprise one or more receivers. The detected signal s(t) corresponds to the subsurface response with the addition of noise, written n(t). On reception, processing consists in decoding the signal s(t) by means of a linear filter D(f) which has a transfer function that is the inverse of the linear filter E(f) used for encoding. It is the output signal y(t) from the decoder D(f) that is processed and which is considered the subsurface response signal.

In accordance with the invention, the signal injected into the subsurface is an energy signal in the form of a plurality of pseudo-random pulse sequences. In the preferred method, pairs of pseudo-random pulse sequences are chosen. These sequences are of the complementary type. Such sequences of the complementary type are encoded pulse sequences having specific properties, in particular orthogonality. Reference may be made to an article entitled "Complementary sets of sequences" by C. Tseng and C. Liu published in IEEE Transactions Information Theory, 18/5, 644-652, 1972. Reference may also be made to the article published in IRE Transaction on Information Theory, 82-87, 1961, in which complementary sequences are defined, and in particular Golay sequences.

The method then consists in detecting the signal which has been subjected to attenuation due to passing through various underground formations. The method consists finally in correlating the detected signal with a reference signal. The reference signal comprises a plurality of pseudo-random pulse sequences, having the same number of sequences as the emitted signal. The sequences of both signals are selected so that the result of correlation which yields the subsurface response signal does not have secondary lobes.

The injected signal p(t) may be of various wave forms: sinewave arcs or squarewave signals. Even in the cases described below relating to aquarewave signals, the signal p(t) injected into the subsurface may equally comprise sinewave arcs. Other waveforms are also possible.

The method is described in greater detail below on the basis of two examples in which the injected signal corresponds to a signal comprising a pair, for example, of pseudo-random sequences of the complementary sequence type.

The first example is shown in FIGS. 3a, 3b and 4a, 4b, and relates to injecting a pair of pseudo-random pulse sequences comprising two Golay sequences Ga(k) and Gb(k) into the subsurface. As can be seen in these figures, the two Golay sequences comprise positive amplitude pulses and negative amplitude pulses that obey the criteria set forth in the above-mentioned articles concerning complementary sequences.

Figure 4A:
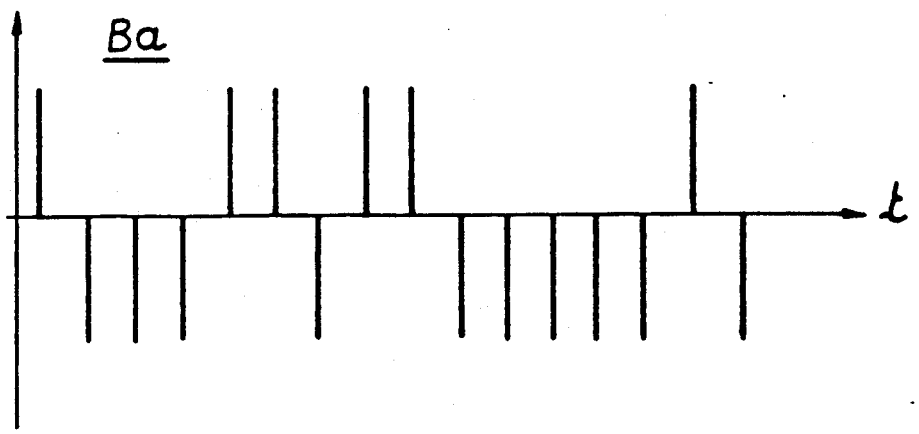
FIGS. 4a and 4b show the reference signals corresponding, in accordance with the invention, to the sequences of FIGS. 3a and 3b.

In accordance with one embodiment of the invention, the detected signal y(t) comprises a first response to the first sequence Ga(k) of a complementary pair and a second response to the second sequence Gb(k) of such a pair. In accordance with the invention, a correlation written RGaBa is then performed between the first detected signal y1(t) and a reference signal Ba which is a binary sequence corresponding to the first emitted sequence Ga(k). The sequence Ba is shown in FIG. 4a. Thus:

$$RGaBa = y1 \times Ba$$

Figure 4B:
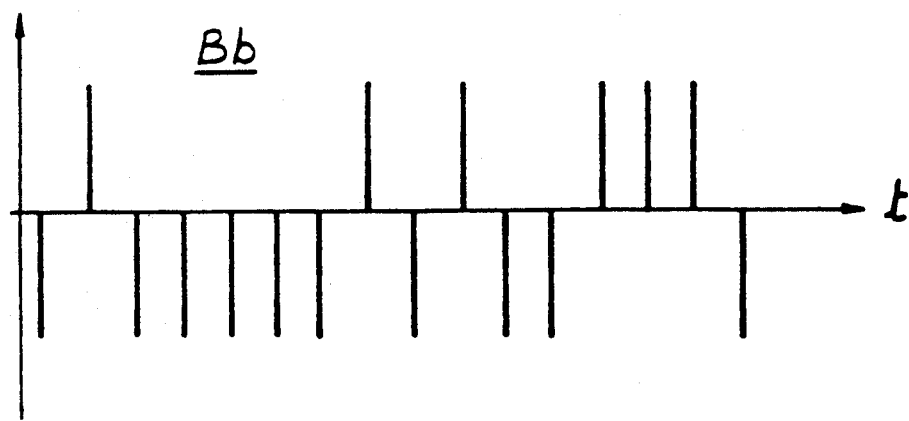

Similarly, a correlation written RGbBb is performed between the second detected signal y2(t) and a reference sequence Bb which is a binary sequence corresponding to the second emitted sequence Gb(k). Sequence Bb is shown in FIG. 4b. Thus:

$$RGbBb = y2 \times Bb$$

Figure 5A:
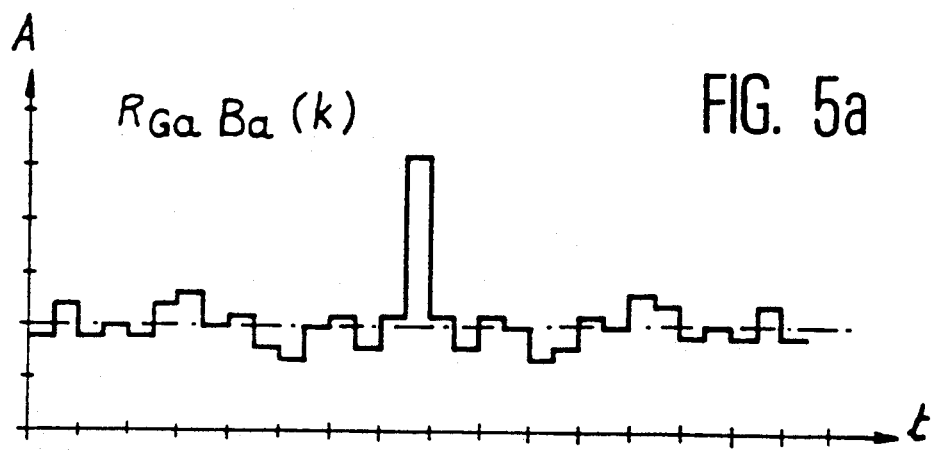
FIGS. 5a and 5b show the signals obtained after processing the signals of FIGS. 3a and 3b.
Figure 5B:
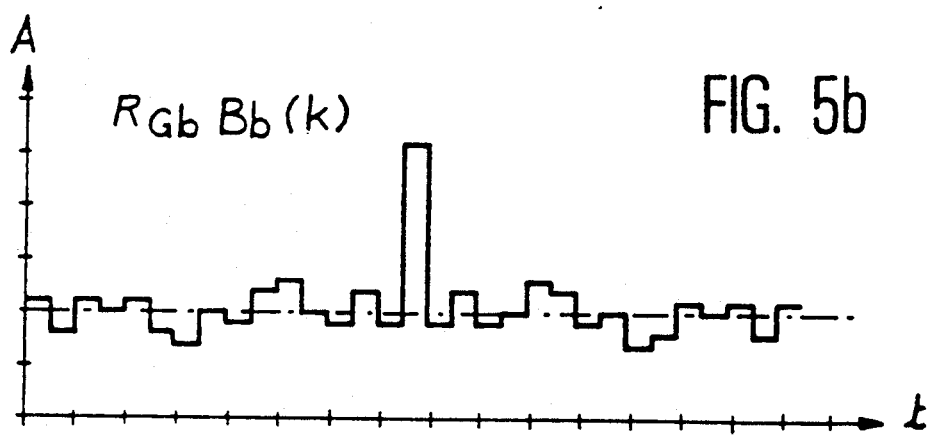

The result of the first correlation RGaBa(k) is shown in FIG. 5a. The result of the second correlation RGbBb(k) is shown in FIG. 5b.

Figure 6:
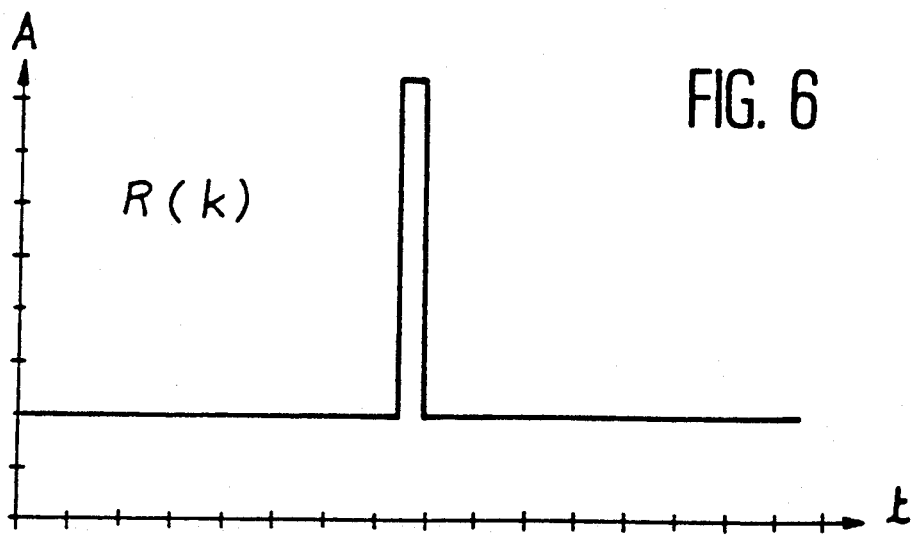
FIG. 6 represents the response signal obtained after final processing.

In accordance with the method, these two correlations are then summed to obtain the response signal R(k) as shown in FIG. 6, i.e.:

$$R = RGaBa + RGbBb$$

These correlations are performed in a time window and the result can be seen in FIG. 6. FIG. 6 shows that there is an amplitude maximum in the center of the window with zeros everywhere else.

As mentioned above, another aspect of the invention consists in choosing the signal to be injected so that it is made up of a plurality of orthogonal complementary sequence pairs, and injecting the signal from a plurality of sources simultaneously, with the response of the subsurface to these sequences being received by a receiver.

Figure 7:
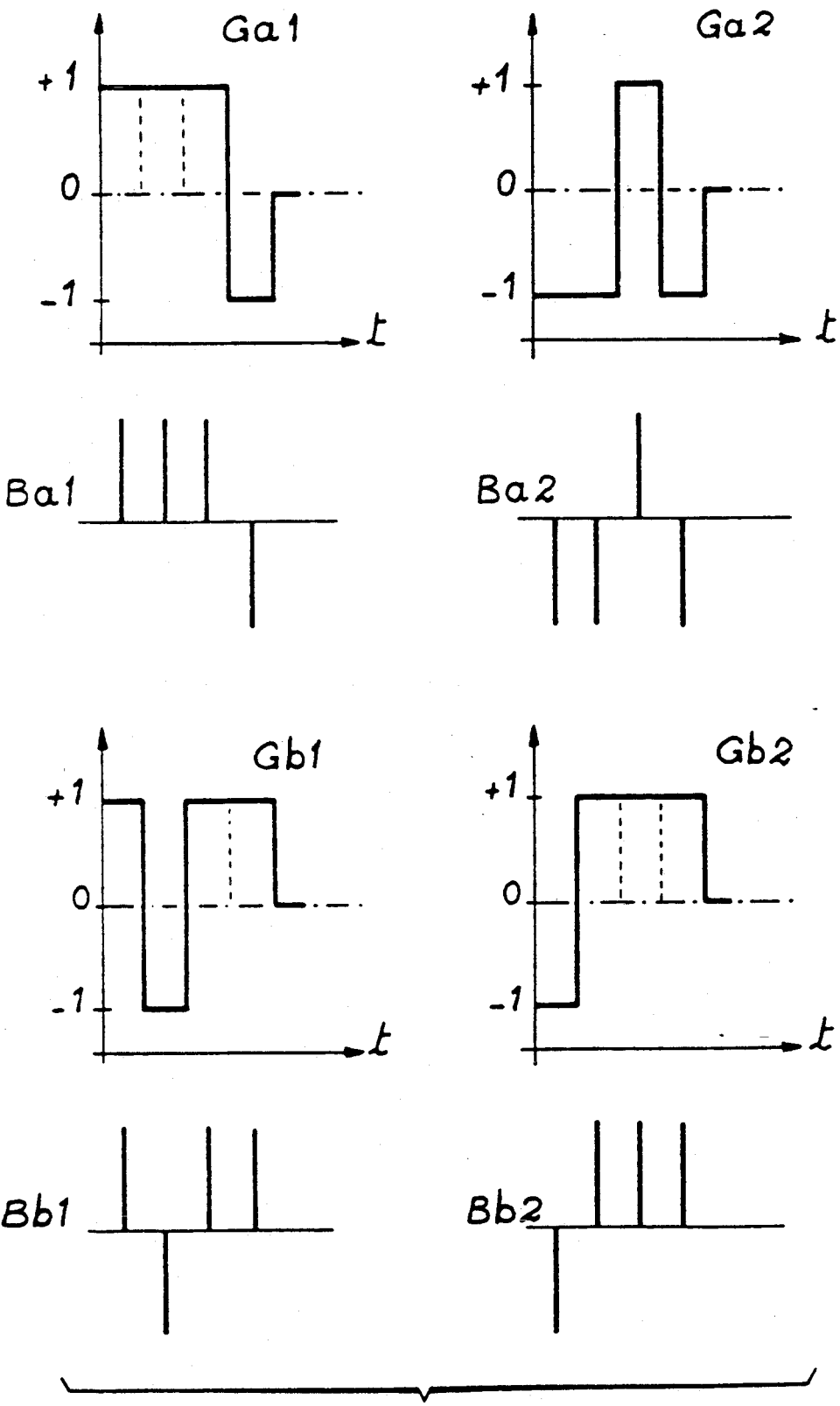
FIG. 7 shows a second example comprising two pairs of complementary sequences and the corresponding reference signals.

In the description below, the example concerns two sources simultaneously emitting Golay sequences as shown in FIG. 7. A first source emits sequences Ga1 and Gb1, while a second source simultaneously emits sequences Ga2 and Gb2. According to this embodiment of the invention, the method comprises simultaneously injecting the sequences Ga1, Ga2, and then Gb1, Gb2. A receiver or a set of receivers detects the two subsurface response signals Ra, Rb corresponding to the combination of the simultaneously-injected sequences:

$$Ra = ya1 + ya2$$

$$Rb = yb1 + yb2$$

Processing then consists of correlating the first receiver signal Ra with a reference sequence Ba1, then correlating the second receiver signal Rb with a reference sequence Bb1, and finally summing the two correlations to obtain a first response r1 of the subsurface to the signal emitted from the first source S1:

$$r1(S1) = Ra \times Ba1 + Rb \; Bb1$$

The same procedure is applied to the other two sequences. Correlation is thus performed between the first receiver signal Ra and the sequence Ba2 and correlation is then performed between the second receiver signal Rb and the sequence Rb2. These two correlations are summed, thus providing a response signal r2 corresponding to the signal injected by the second source S2:

$$r2(S2) = Ra \times Ba2 + Rb \times Bb2$$

Thus, the reference signal, used in this case for performing the correlation operation for a given source, comprises binary sequences corresponding to the sequences used by the source. The reference signals Ba1, Bb1 and Ba2, Bb2 are shown in FIG. 7. In addition, the complementary sequences selected for each of the sources are sequences which are mutually orthogonal.

The properties of orthogonality can be summed up as follows: when a correlation is performed between the sequences emitted simultaneously by the various sources and when the set of correlations are added together, the result obtained is zero throughout the time window in which the correlation is performed.

Thus, to return to the example given concerning FIG. 7, when a correlation is performed between the sequences Ba1 and Ba2 and between the sequences Bb1 and Bb2, and when these two correlations are summed together, zero is obtained throughout.

According to another characteristic of the method, the orthogonal complementary sequences may be emitted from sources disposed in distinct wells, with the response signals of the geophysical formation to emission from each of these sources being received by a receiver or a set of receivers placed in another well.

Returning to the example given above and applying it to this aspect of the invention, one source is disposed in a first well and is used, for example, to inject the sequences Ga1 and Gb1 into geophysical formation, and a second source is disposed in a second well to inject the sequences Ga2 and Gb2. A receiver or a set of receivers is then disposed in a third well that is distinct from the first two wells. The injected signals are preferably obtained from seismic sources (with frequencies generally being less than 1 kHz). This technique comprises an application of the method to cross-well seismic surveying.

According to another characteristic of the invention; the orthogonal complementary sequences may be injected from sources disposed in the same well. The receiver(s) is/are then disposed in that well. The procedure is applicable to logging.

One example of such an application, is acoustic velocity logging and more particularly of tools including a plurality of sources of different kinds, e.g. one monopole and two mutually perpendicular horizontal dipoles. The monopole source serves to obtain compression velocity, and the dipole sources to obtain shear velocities in two different directions.

The acquisition time for a measurement is limited by the speed of displacement of the logging tool. Consequently, by using complementary sequences to excite a source, it is possible to improve the signal-to-noise ratio by increasing the total energy emitted in a given length of time. By simultaneously exciting a plurality of sources (monopole and dipole) using orthogonal complementary sequences, it is possible further to increase the energy emitted by each of these sources and to increase the quality of the measurement. In addition, by exciting the sources simultaneously, it is possible to perform various different measurements (compression velocity and shear velocity) at exactly the same instant, and consequently while facing the same formation.

The signals injected in this second application are preferably signals obtained from acoustic sources (having frequencies generally of the order of 5 kHz).

It is to be understood that while the devices described throughout the specification are preferred embodiments of the invention, various alternatives, modifications, and equivalents may be used. Therefore, the above description should not be taken as limiting the invention which is defined by the appended claims.

We claim:

1. A geophysical prospecting method comprising the following steps:

injecting seismic signal energy in the form of at least two pseudo-random pulse sequences of the complementary sequence type into an underground formation with a source located in a first well;

detecting the seismic signal energy after the seismic signal energy has been attenuated by passing through the underground formations in the form of a response signal with a receiver located in a second well; and correlating the response signal with a reference signal comprising at least two pseudo-random binary sequences to yield correlations, and summing the correlations so that a resultant signal does not have secondary lobes.

2. A geophysical prospecting method according to claim 1, characterized in that the injected signal energy comprises an even number of complementary sequences, the reference signal comprises a like number of pseudo-random sequences so that the resultant signal obtained in a given time window by summing the correlations has a maximum in the center of the window and zeros throughout the remainder of the window.

3. A geophysical prospecting method according to claim 2, characterized in that the injected signal comprises two sequences, the sequences comprising a pair of Golay sequences, and the reference signal comprising two binary sequences corresponding to the Golay sequences.

4. A geophysical prospecting method according to claim 2, including injecting orthogonal complementary sequences from a plurality of sources that emit simultaneously.

5. A geophysical prospecting method according to claim 2, including injecting with a plurality of sources at least one pair of complementary sequences per source, with all of the sources injecting their respective sequences simultaneously.

6. A geophysical prospecting method according to claim 2, including injecting the complementary sequences from sources disposed in distinct wells.

7. A geophysical prospecting method according to claim 2, including in injecting the complementary sequences from sources disposed in a common well.

8. A geophysical prospecting method according to any one of claim 6, characterized in that the energy signal is a seismic signal.

9. A geophysical propecting method according to any one of claims 7, characterized in that the energy signal is an acoustic signal.

* * * * *